US 7,102,423 B2

(12) United States Patent
Lee et al.

(10) Patent No.: US 7,102,423 B2
(45) Date of Patent: Sep. 5, 2006

(54) VOLTAGE BOOSTING CIRCUIT AND METHOD OF GENERATING BOOSTING VOLTAGE, CAPABLE OF ALLEVIATING EFFECTS OF HIGH VOLTAGE STRESS

(75) Inventors: Seung-Hoon Lee, Kyungki-do (KR); Jae-Yoon Sim, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/732,826

(22) Filed: Dec. 9, 2003

(65) Prior Publication Data

US 2004/0183586 A1    Sep. 23, 2004

(30) Foreign Application Priority Data

Dec. 10, 2002    (KR)    ............... 10-2002-0078383

(51) Int. Cl.
*G05F 1/10*    (2006.01)
(52) U.S. Cl. ................. 327/536; 327/537; 363/60
(58) Field of Classification Search ............... 327/536, 327/537; 363/59, 60
See application file for complete search history.

(56) References Cited

U.S. PATENT DOCUMENTS

| 3,824,447 A | * | 7/1974 | Kuwabara ............... 363/60 |
| 5,095,223 A | * | 3/1992 | Thomas ............... 363/30 |
| 5,491,623 A | * | 2/1996 | Jansen ............... 327/536 |
| 5,856,918 A | * | 1/1999 | Soneda et al. ............ 327/536 |
| 6,021,056 A | * | 2/2000 | Forbes et al. ............ 327/536 |
| 6,278,318 B1 | * | 8/2001 | Watanabe ............ 327/536 |
| 6,356,469 B1 | * | 3/2002 | Roohparvar et al. ............ 327/536 |
| 6,429,725 B1 | * | 8/2002 | Tanzawa et al. ............ 327/536 |
| 6,486,729 B1 | * | 11/2002 | Imamiya ............ 327/536 |
| 6,642,775 B1 | * | 11/2003 | Imamiya ............ 327/536 |

FOREIGN PATENT DOCUMENTS

JP    7-111095    4/1995

OTHER PUBLICATIONS

English language abstract of Japanese Publication No. 7-111095.

* cited by examiner

*Primary Examiner*—Terry D. Cunningham
(74) *Attorney, Agent, or Firm*—Marger Johnson & McCollom, P.C.

(57) ABSTRACT

A voltage boosting circuit and a method of generating a boosting voltage alleviate deterioration of a driver transistor caused by high voltage stress when the level of an external supply voltage is high. The voltage boosting circuit includes boosting capacitors and switches. The boosting capacitors include a first boosting capacitor connected to a driving node and a last boosting capacitor that outputs the boosting voltage. The switches connect the boosting capacitors in series in response to a control signal. The boosting voltage increases or decreases as the voltage level at the driving node changes according to the logic state of a boosting level control signal. The boosting level control signal is responsive to the external supply voltage level. An external supply voltage detector detects the level of external supply voltage level and generates the boosting level control signal.

18 Claims, 3 Drawing Sheets

VOLTAGE BOOSTING CIRCUIT AND METHOD OF GENERATING BOOSTING VOLTAGE, CAPABLE OF ALLEVIATING EFFECTS OF HIGH VOLTAGE STRESS

CROSS REFERENCE TO RELATED APPLICATIONS

This application claims priority from Korean Patent Application No. 2002-78383, filed on 10 Dec. 2002, in the Korean Intellectual Property Office, the disclosure of which is hereby incorporated by reference in its entirety.

BACKGROUND OF THE INVENTION

1. Field of the Invention

This disclosure relates to a semiconductor device, and more particularly, to a voltage boosting circuit that generates a boosting voltage that is higher than the external supply voltage and a method of generating the boosting voltage.

2. Description of the Related Art

Semiconductor memory devices use a boosting voltage that is higher than the external supply voltage to access memory cells. In general, a pumping circuit is used to boost a supply voltage power level to the boosted voltage power level.

The pumping circuit used in the semiconductor memory devices boosts the voltage at an internal node and outputs the boosted voltage via a driver transistor. Hence, high voltage stress is imposed on the driver transistor, and thus, the driver transistor may undergo deterioration. The deterioration intensifies as the supply voltage power level increases.

Recently, a decrease in the operating voltage of the pumping circuit, i.e., the external supply voltage, has resulted in an increase in the number of boosting stages of the pumping circuit allowing for high pumping efficiency. As a result, the problems related to high voltage stress become even more serious than before.

Embodiments of the invention address these and other disadvantages of the art.

SUMMARY OF THE INVENTION

Embodiments of the invention provide a voltage boosting circuit which is capable of alleviating deterioration of a driver transistor, caused by high voltage stress.

Embodiments of the invention also provide a method of generating a boosting voltage, by which deterioration of a driver transistor, caused by high voltage stress, can be alleviated.

BRIEF DESCRIPTION OF THE DRAWINGS

The above and other aspects and advantages of the invention will become more apparent by describing in detail an exemplary embodiment thereof with reference to the attached drawings.

DETAILED DESCRIPTION OF THE INVENTION

The invention will now be described more fully with reference to the accompanying drawings, in which a preferred embodiment of the invention is shown.

Figure 1:
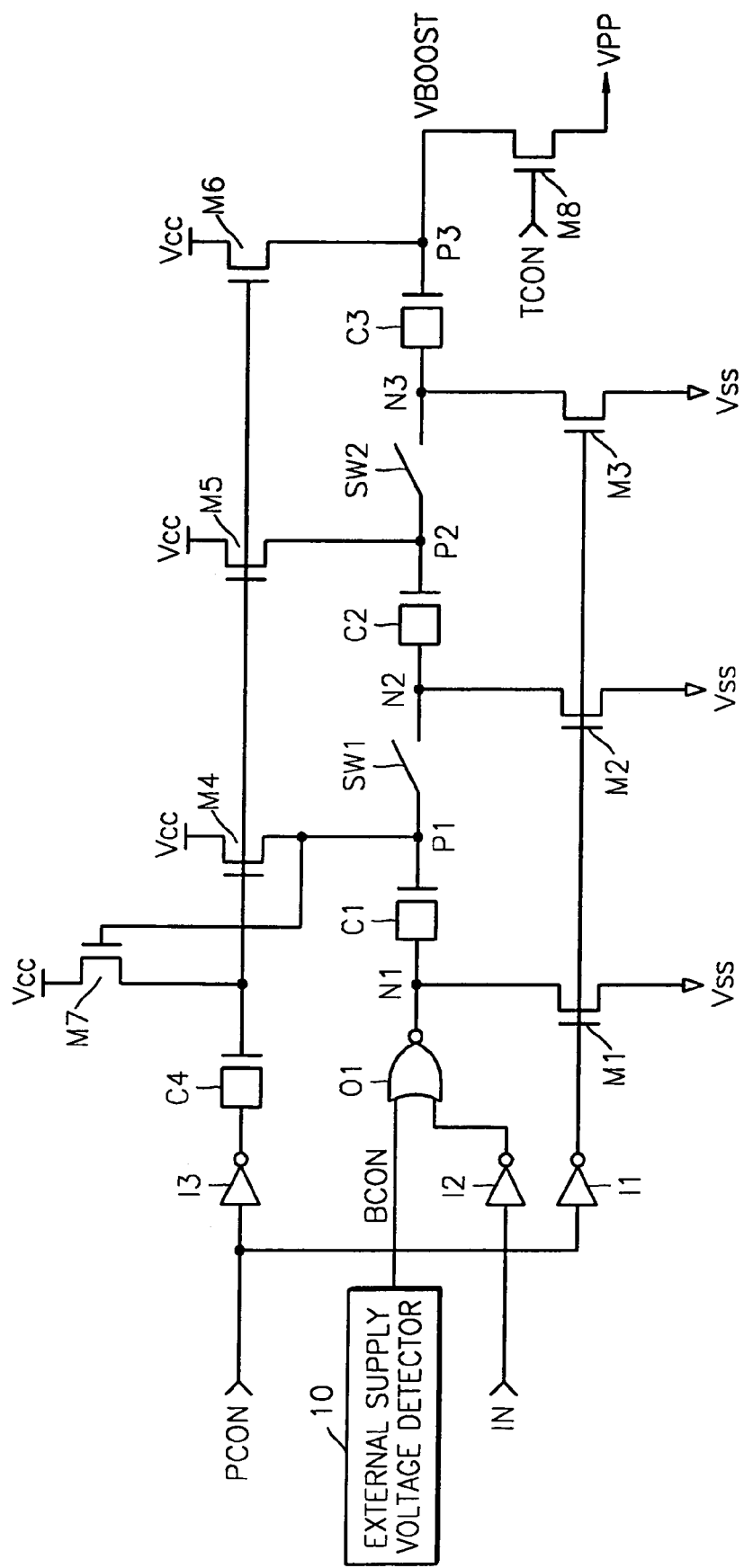
FIG. 1 is a circuit diagram illustrating a voltage boosting circuit in accordance with an embodiment of the invention.

FIG. 1 is a circuit diagram illustrating a voltage boosting circuit in accordance with an embodiment of the invention.

Referring to FIG. 1, the voltage boosting circuit includes boosting capacitors C1, C2, and C3; switches SW1 and SW2; pull-down transistors M1, M2, and M3; pull-up transistors M4, M5, M6, and M7; a driver transistor M8; inverters I1, I2, and I3; a NOR gate O1; and a capacitor C4.

The switches SW1 and SW2 connect the boosting capacitors C1, C2, and C3 in series, in response to a control signal (not shown). One terminal of the boosting capacitor C1 is connected to the driving node N1. A boosting voltage VBOOST is output from the node P3. The boosting voltage VBOOST is output from the circuit as a voltage VPP via the driver transistor M8.

In particular, the level of boosting voltage VBOOST increases or decreases as the voltage level at the driving node N1 changes according to the logic state of the boosting level control signal BCON. That is, the number of boosting stages varies with the logic state of the boosting level control signal BCON.

The boosting level control signal BCON is generated by an external supply voltage detector 10, which detects the level of external supply voltage $V_{CC}$, and changes to a logic "low" signal or a logic "high" signal with respect to the level of external supply voltage $V_{CC}$. More specifically, the external supply voltage detector 10 detects the level of external supply voltage $V_{CC}$ and sets the boosting level control signal BCON to a logic "low" signal when the level of external supply voltage $V_{CC}$ is less than the reference voltage level. When the level of external supply voltage $V_{CC}$ is greater than the reference voltage level, the external supply voltage detector 10 sets the boosting level control signal BCON to a logic "high" signal.

Figure 2:
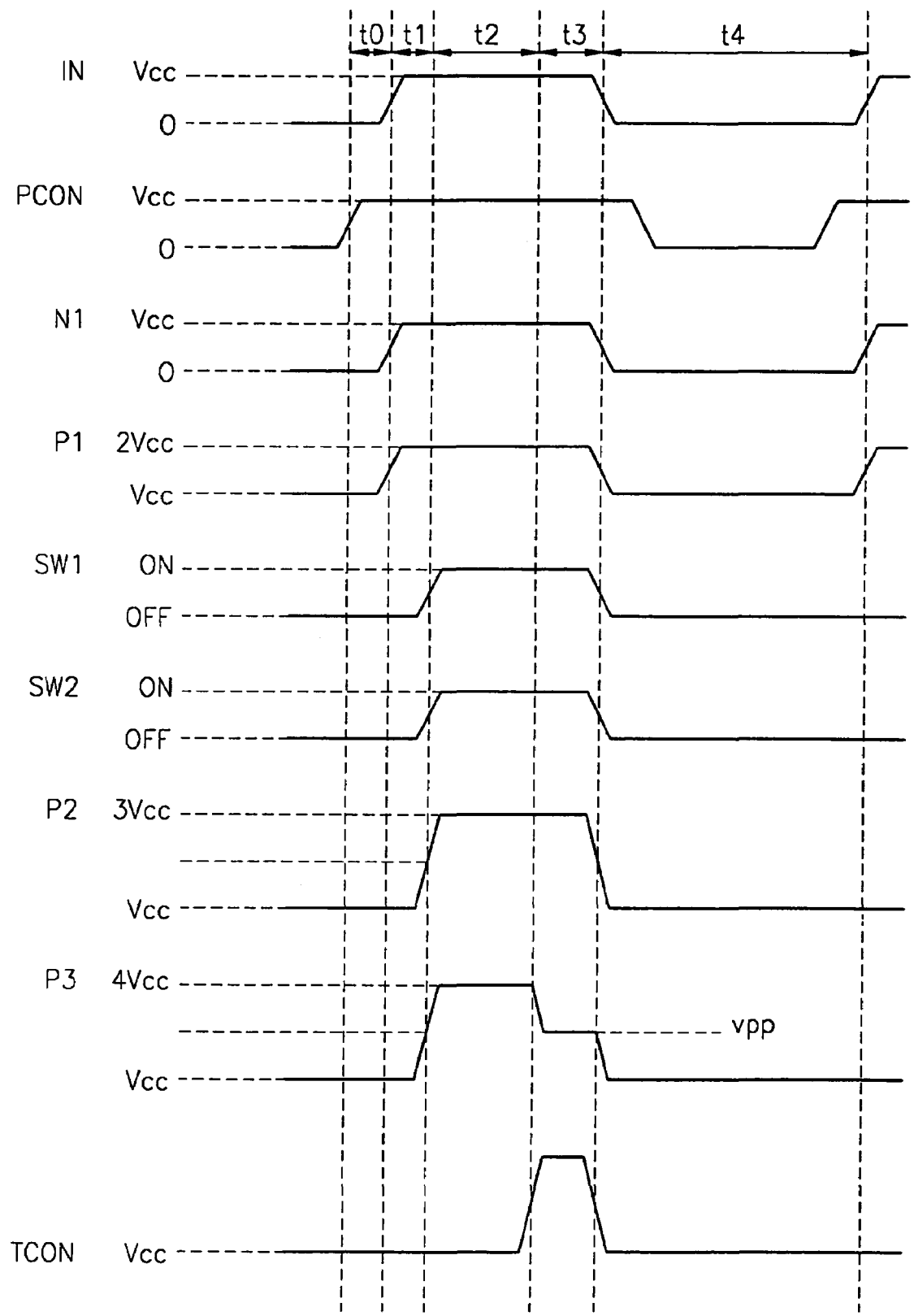
FIG. 2 is a timing diagram for the voltage boosting circuit of FIG. 1 when a boosting level control signal is in the logic "low" state.
Figure 3:
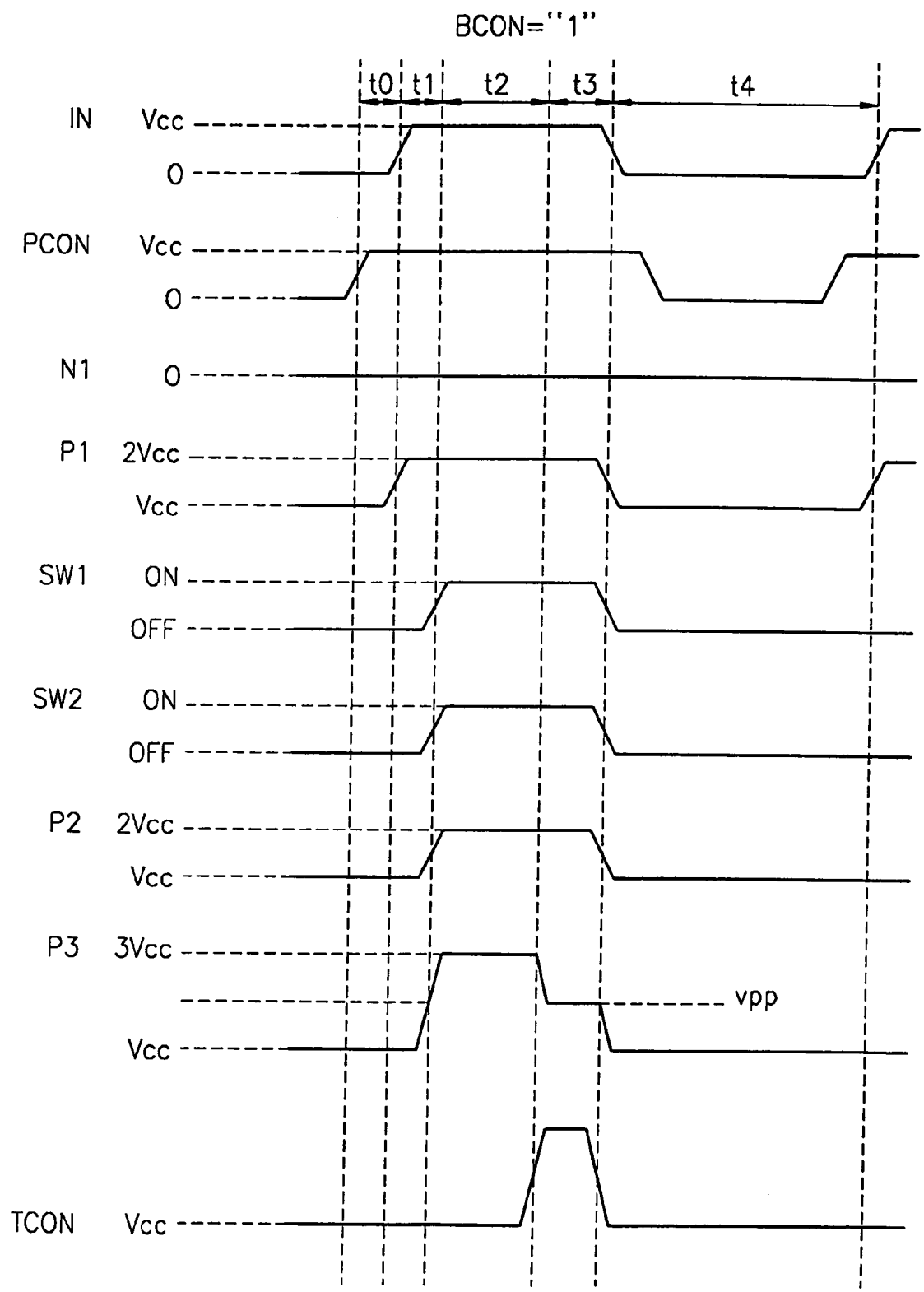
FIG. 3 is a timing diagram for the voltage boosting circuit of FIG. 1 when a boosting level control signal is in the logic "high" state.

FIG. 2 is a timing diagram for the voltage boosting circuit of FIG. 1 when the boosting level control signal BCON is in the logic "low" state. FIG. 3 is a timing diagram for the voltage boosting circuit of FIG. 1, when the boosting level control signal BCON is in the logic "high" state.

Hereinafter, the operation of the voltage boosting circuit of FIG. 1 and a method of generating the boosting voltage will be described with reference to FIGS. 2 and 3. When a precharge control signal PCON is in a logic "low" state, the pull-down transistors M1, M2, and M3 are sequentially turned on, and voltage levels at nodes N1, N2, and N3 are precharged to the level of ground voltage VSS. Also, the pull-up transistors M4, M5, M6, and M7 are turned on, and voltage levels at nodes P1, P2, and P3 are precharged to the level of external supply voltage $V_{CC}$.

Thereafter, the precharge control signal PCON enters a logic "high" state, and the pull-down transistors M1, M2, and M3 and the pull-up transistor M4, M5, M6, and M7 are turned off. At this time, when the boosting level control signal BCON is in a logic "low" state, the voltage level at the driving node N1 rises from the ground voltage level to the external supply voltage level $V_{CC}$ as the level of the input signal IN rises from the ground voltage level to the external supply voltage level $V_{CC}$. As a result, the voltage level at node P1 is boosted from the external supply voltage level $V_{CC}$ to a level that is two times the external supply voltage level $V_{CC}$, i.e., $2V_{CC}$. After a time t1 has passed, the switches SW1 and SW2 are turned on. Then the voltage level at node P2 is boosted from the external supply voltage $V_{CC}$ level to a level that is three times the external supply voltage $V_{CC}$, i.e., $3V_{CC}$, and the voltage level at node P3 is boosted from the external supply voltage level $V_{CC}$ to a level that is four times the external supply voltage $V_{CC}$, i.e., $4V_{CC}$. That is, the level of boosting voltage VBOOST is boosted to the level of $4V_{CC}$ when the boosting level control signal BCON is in a logic "low" state.

When the boosting level control signal BCON is in a logic "high" state, the voltage level at driving node N1 is fixed at the ground voltage level, irrespective of the level of input signal IN. Thus, the voltage level at node P1 is maintained at the external supply voltage level $V_{CC}$. As a result, once the switches SW1 and SW2 are turned on and after a time t1 has passed, the voltage level at node P2 is boosted from the external supply voltage level $V_{CC}$ to the level of $2V_{CC}$. Also, the voltage level at the node P3 is boosted from the external supply voltage level $V_{CC}$ to the level of $3V_{CC}$. In other words, when the boosting level control signal BCON is in a logic "high" state (VBOOST=$3V_{CC}$), the level of boosting voltage VBOOST is decreased by $V_{CC}$ compared to when the boosting level control signal BCON is in a logic "low" state (VBOOST=$4V_{CC}$).

In the voltage boosting circuit according to an embodiment of the invention, when the boosting level control signal BCON is in a logic "low" state, that is, when the external supply voltage level $V_{CC}$ is less than the reference voltage, the number of boosting stages increases, and thus, the boosting voltage level VBOOST increases to the level of $4V_{CC}$. In contrast, when the boosting level control signal BCON is in a logic "high" state, that is, when the external supply voltage level $V_{CC}$ is greater than the reference voltage, the number of boosting stages decreases, and thus, the boosting voltage level VBOOST increases to the level of $3V_{CC}$.

As described above, when the external supply voltage level $V_{CC}$ is greater, the deterioration of driver transistor M8 (connected to the node P3) is alleviated by increasing the boosting voltage level VBOOST to the level of $3V_{CC}$.

Therefore, when the external supply voltage level is high, a voltage boosting circuit and a method of generating a boosting voltage can alleviate deterioration of a driver transistor caused by high voltage stress.

Embodiments of the invention will now be described in a non-limiting way.

According to an embodiment of the invention, there is provided a voltage boosting circuit including a number of boosting capacitors and a number of switches. The boosting capacitors include a first boosting capacitor connected to a driving node and a last boosting capacitor that outputs a boosting voltage. In response to a control signal, the switches connect the boosting capacitors in series. The level of the boosting voltage increases or decreases as the voltage level at the driving node changes, according to the logic state of a boosting level control signal.

Preferably, when the boosting level control signal is in a first logic state, the voltage level at the driving node changes from a ground voltage level to an external supply voltage level, and thus, the boosting voltage level increases. When the boosting level control signal is in a second logic state, the voltage level at the driving node is fixed at the ground voltage level, and thus, the level of boosting voltage decreases.

The boosting level control signal enters a logic high state or a logic low state with respect to the level of external supply voltage. The boosting level control signal is generated by an external supply voltage detector that detects the level of external supply voltage.

According to another embodiment of the invention, there is provided a method of generating a boosting voltage in a voltage boosting circuit that includes a number of boosting capacitors with a first boosting capacitor connected to a driving node and a last boosting capacitor that outputs a boosting voltage, and a number of switches that connect the boosting capacitors in series, in response to a control signal. According to the method, when a boosting level control signal is in a first logic state, the boosting voltage level is increased by changing a voltage level at the driving node from a ground voltage level to an external supply voltage level. When the boosting level control signal is in a second logic state, the boosting voltage level is decreased by fixing the voltage level at the driving node to the ground voltage level.

The method further includes detecting the external supply voltage level, changing the boosting level control signal to the first logic state when the external supply voltage level is less than a reference voltage level, and changing the level of the boosting level control signal to the second logic state when the external supply voltage level is greater than the reference voltage level.

While the invention has been particularly shown and described with reference to an exemplary embodiment thereof, it will be understood by those of ordinary skill in the art that various changes in form and details may be made therein without departing from the spirit and scope of the invention as defined by the appended claims and their equivalents.

The invention claimed is:

1. A voltage boosting circuit comprising:
    boosting capacitors that include a first boosting capacitor connected to a driving node and a last boosting capacitor configured to output a boosting voltage;
    switches configured to connect the boosting capacitors in series in response to a control signal, the boosting voltage configured to vary as a voltage level at the driving node changes according to a logic state of a boosting level control signal;
    a logic device having an output applied to the driving node and an input to receive the boosting level control signal, wherein the control signal and the boosting level control signal are configured to operate independently of each other, wherein the logic state of the boosting level control signal is configured to enter a logic high state or a logic low state in response to an external supply voltage level; and
    an external supply voltage detector configured to detect the external supply voltage level and to generate the boosting level control signal.

2. The voltage boosting circuit of claim 1, configured such that when the boosting level control signal is in a first logic state, the voltage level at the driving node changes from a ground voltage level to an external supply voltage level, thus increasing the boosting voltage level.

3. The voltage boosting circuit of claim 2, configured such that when the boosting level control signal is in a second logic state, the voltage level at the driving node is fixed at a ground voltage level, thus decreasing the boosting voltage level.

4. The voltage boosting circuit of claim 1, wherein the driving node is configured to have a constant voltage during both an open and closed state of the switches.

5. The voltage boosting circuit of claim 3, having N boosting capacitors, wherein N is an integer greater than 1.

6. The voltage boosting circuit of claim 5, wherein the boosting level voltage is substantially equal to (N+1) multiplied by the external supply voltage level for the first logic state, and substantially equal to N multiplied by the external supply voltage level for the second logic state.

7. The voltage boosting circuit of claim 1, wherein the logic device is a NOR gate.

8. The voltage boosting circuit of claim 1, wherein the voltage level at the driving node is responsive to an input signal that is logically combined with the boosting level control signal.

9. The voltage boosting circuit of claim 1, further comprising an external supply voltage detector to detect an external supply voltage, wherein the external supply voltage detector outputs a logic signal responsive to the external supply voltage.

10. The voltage boosting circuit of claim 9, wherein the external supply voltage detector output is the boosting level control signal.

11. The voltage boosting circuit of claim 1, further comprising a transistor disposed between one side of the first boosting capacitor and an external power supply for affecting the voltage at the first boosting capacitor depending on the driving state of the transistor.

12. A method of generating a boosting voltage in a voltage boosting circuit that includes boosting capacitors with a first boosting capacitor connected to a driving node and a last boosting capacitor that outputs the boosting voltage, switches that connect the boosting capacitors in series in response to a control signal, and a logic device having an output applied to the driving node and an input to receive a boosting level control signal, the method comprising:
  detecting an external supply voltage level using an external supply voltage detector;
  generating the boosting level control signal as an output of the external supply voltage detector, wherein a logic state of the boosting level control signal is configured to enter a logic high state or a logic low state in response to the external supply voltage level;
  increasing the boosting voltage by changing a voltage level at the driving node from a ground voltage level to the external supply voltage level when the boosting level control signal is in the logic high state; and
  decreasing the boosting voltage by an amount approximately equal to the external supply voltage level by fixing the voltage level at the driving node to the ground voltage level when the boosting level control signal is in the logic low state, wherein the control signal and the boosting level control signal are configured to operate independently of each other.

13. A voltage boosting circuit, comprising:
  a first boosting capacitor and a second boosting capacitor, wherein the second boosting capacitor outputs a boosted voltage;
  one or more switches, which are responsive to a first control signal, to connect the first and the second boosting capacitors in series;
  a pull-up transistor circuit and a pull-down transistor circuit, both pull-up and pull-down transistor circuits each having transistors that are connected to the one or more switches;
  an external supply voltage detector configured to detect an external supply voltage level and to generate a second control signal, wherein a logic state of the second control signal is configured to enter a logic high state or a logic low state in response to the external supply voltage level; and
  a logic device, which is responsive to the second control signal, for applying one of a plurality of voltage levels to the first boosting capacitor, wherein the second control signal and the first control signal are configured to operate independently of each other.

14. The voltage boosting circuit of claim 13, further comprising one or more additional boosting capacitors between the first and the second boosting capacitors.

15. The voltage boosting circuit of claim 14, further comprising one or more additional switches to connect the one or more additional boosting capacitors and the first and the second boosting capacitors in series in response to the first control signal.

16. The voltage boosting circuit of claim 13, further comprising a precharge control signal commonly connected to both the pull-up transistor circuit and the pull-down transistor circuit.

17. The voltage boosting circuit of claim 13, wherein the pull-up transistor circuit and the pull-down transistor circuit are both commonly responsive to a precharge control signal.

18. The voltage boosting circuit of claim 13, wherein the logic device includes a NAND gate.

* * * * *